US010694330B2

(12) United States Patent
Barrett et al.

(10) Patent No.: US 10,694,330 B2
(45) Date of Patent: Jun. 23, 2020

(54) VALIDATING MOBILE APPLICATIONS FOR ACCESSING REGULATED CONTENT

(71) Applicant: Medidata Solutions Inc., New York, NY (US)

(72) Inventors: Kevin Anthony Barrett, Los Altos, CA (US); Patrick Michael Pollard, Los Altos, CA (US); Patrick Roberts, Danville, CA (US); Martin Frid-Nielsen, Menlo Park, CA (US)

(73) Assignee: Metadata Solutions, Inc., New York, NY (US)

( * ) Notice: Subject to any disclaimer, the term of this patent is extended or adjusted under 35 U.S.C. 154(b) by 0 days.

(21) Appl. No.: 15/853,630

(22) Filed: Dec. 22, 2017

(65) Prior Publication Data

US 2018/0184250 A1    Jun. 28, 2018

Related U.S. Application Data

(60) Provisional application No. 62/438,136, filed on Dec. 22, 2016.

(51) Int. Cl.
| | |
|---|---|
| *H04W 4/024* | (2018.01) |
| *H04W 4/50* | (2018.01) |
| *H04W 4/60* | (2018.01) |
| *H04L 9/32* | (2006.01) |
| *G06F 21/10* | (2013.01) |

(52) U.S. Cl.
CPC .......... *H04W 4/024* (2018.02); *G06F 21/10* (2013.01); *H04L 9/3213* (2013.01); *H04L 9/3263* (2013.01); *H04W 4/50* (2018.02); *H04W 4/60* (2018.02)

(58) Field of Classification Search
CPC ...... H04W 4/024; H04W 4/50; H04L 9/3263; H04L 9/3213; G06F 21/10
See application file for complete search history.

(56) References Cited

U.S. PATENT DOCUMENTS

| | | | |
|---|---|---|---|
| 7,676,835 B2 | 3/2010 | Brannon et al. | |
| 8,428,264 B2 * | 4/2013 | Maestrini | H04L 63/08 380/274 |
| 8,671,132 B2 | 3/2014 | Carlson | |

(Continued)

OTHER PUBLICATIONS

PCT International Search Report and Written Opinion for PCT/US16/45920, dated Oct. 21, 2016, 11 Pages.

*Primary Examiner* — Muthuswamy G Manoharan
(74) *Attorney, Agent, or Firm* — Fenwick & West LLP

(57) ABSTRACT

Allowing access to regulated content (e.g., FDA regulated) via mobile devices can increase operational efficiency of companies that have this type of content, and allow users to quickly interact with this content even when outside of the company office. Yet, mobile devices present security issues in ensuring that the integrity of the regulated content is maintained. A regulated content management system applies a multi-step validation and authentication process to allow mobile access to regulated content. The system validates a mobile application installed on the device for regulated content access, the mobile device itself, and the credentials of the user trying to access the content before access is granted. This thus provides users with access to regulated content in a mobile environment while maintaining the integrity of the regulated content.

20 Claims, 6 Drawing Sheets

(56) References Cited

U.S. PATENT DOCUMENTS

| | | | |
|---|---|---|---|
| 9,690,925 B1* | 6/2017 | Banerjee | G06F 21/44 |
| 2003/0093518 A1 | 5/2003 | Hiraga | |
| 2004/0177270 A1* | 9/2004 | Little | G06F 21/62 |
| | | | 713/166 |
| 2005/0154908 A1 | 7/2005 | Okamoto | |
| 2006/0184764 A1 | 8/2006 | Osaki | |
| 2007/0220593 A1 | 9/2007 | Burakoff et al. | |
| 2010/0161993 A1 | 6/2010 | Mayer | |
| 2010/0313117 A1 | 12/2010 | Fukasawa | |
| 2011/0184910 A1 | 7/2011 | Love et al. | |
| 2012/0036494 A1* | 2/2012 | Gurumohan | G06Q 10/103 |
| | | | 717/106 |
| 2012/0273568 A1 | 11/2012 | Dlott et al. | |
| 2014/0020113 A1* | 1/2014 | Shah | G06F 21/60 |
| | | | 726/27 |
| 2014/0223527 A1* | 8/2014 | Bortz | H04L 63/08 |
| | | | 726/6 |
| 2014/0331060 A1* | 11/2014 | Hayton | G06F 21/31 |
| | | | 713/186 |
| 2016/0188579 A1 | 6/2016 | Veit | |
| 2016/0210427 A1* | 7/2016 | Mynhier | G16H 10/60 |
| 2017/0039392 A1 | 2/2017 | Barrett et al. | |
| 2017/0041319 A1 | 2/2017 | Barrett et al. | |
| 2018/0034822 A1* | 2/2018 | Mistry | H04L 63/101 |

* cited by examiner

VALIDATING MOBILE APPLICATIONS FOR ACCESSING REGULATED CONTENT

CROSS REFERENCE TO RELATED APPLICATIONS

This application claims the benefit of U.S. Provisional Application No. 62/438,136, filed Dec. 22, 2016, which is incorporated by reference in its entirety.

BACKGROUND

Field of Disclosure

This application relates generally to managing regulated content (e.g., FDA regulated content) on non-regulated storage platforms. In particular, the application relates to validating and authenticating users when accessing regulated content via mobile applications installed on mobile devices.

Description of the Related Art

Today, certain content, such as United States Food and Drug Administration (FDA) regulated documents and files, are heavily regulated, including specific regulations around how such documents can be stored and how they can be accessed by users within an organization. This type of content is referred herein as "regulated content." Regulated content is required to be stored on systems subject to change and release management, electronic signatures and electronic records in order to meet all of these regulations. As one example, Title 21 of the Code of Federal Regulations, Part 11 establishes the FDA regulations on electronic records and electronic signatures. This section requires that companies handling FDA regulated information implement various controls, including audits, validations of their systems, electronic signatures, and certain documentation for software and systems that process or store electronic data that is FDA regulated (e.g., data relating to pharmaceuticals, medical devices, and other life sciences industries, etc.). The rules require a careful management and validation of this regulated content, including constantly ensuring a high degree of confidence in the integrity of the files and protecting the files from any possible tampering or quickly detecting if tampering has occurred. Performing this type of careful management and validation can be challenging and expensive for entities that handle these types of files. Allowing mobile devices to access these files creates more opportunity for tampering with files.

SUMMARY

With the ubiquity of mobile devices, accessing regulated content via mobile devices can increase operational efficiency and allow users to quickly interact with regulated content even when outside of the company office. Yet, mobile devices present additional security issues and challenges in ensuring that the integrity of the regulated content is maintained. For example, attackers may tamper or modify mobile devices or mobile applications installed on the devices to access regulated content and cause security breaches, thereby compromising the environment in which the regulated content is handled. Mobile applications are distributed over platforms that are not regulated. Various embodiments as described herein provide users with access to regulated content while maintaining the integrity of the regulated content.

In one embodiment, a regulated content management system authenticates and verifies mobile applications, mobile devices, and user identity to ensure regulated content is accessed and handled as required by rules and regulations. This presents a technical challenge because there can be security issues at any of these levels, at the mobile application level, device level, or user authentication level, and a full and thorough validation must occur to ensure regulated content integrity. The system thus applies a multi-step security process for validation to access the regulated content.

A mobile application for accessing and managing the regulated content is installed on the mobile device by a user. The mobile application is validated upon download and installation on a mobile device such that a certificate for the application is stored with regulated content management system. The mobile device is also authorized to allow use of the mobile device to access regulated content, such that a device identifier (ID) is stored on the system. In addition, the user's credentials are confirmed by the system. The system thus can apply a multi-layer verification to review any one or all of the certificate for the application, the device ID for the device, the user credentials for the user launching the application, and any other data that might be relevant for authorization. The user is logged into the application accessing the regulated content only after this verification and authorization process is completed. One or more steps of this verification process can be performed every time the user attempts to access the regulated content, or every time the user opens or launches the application

BRIEF DESCRIPTION OF THE DRAWINGS

The teachings of the embodiments disclosed herein can be readily understood by considering the following detailed description in conjunction with the accompanying drawings.

Figure (FIG. 1 is a system environment for regulated content management, in accordance with an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Figure 1:
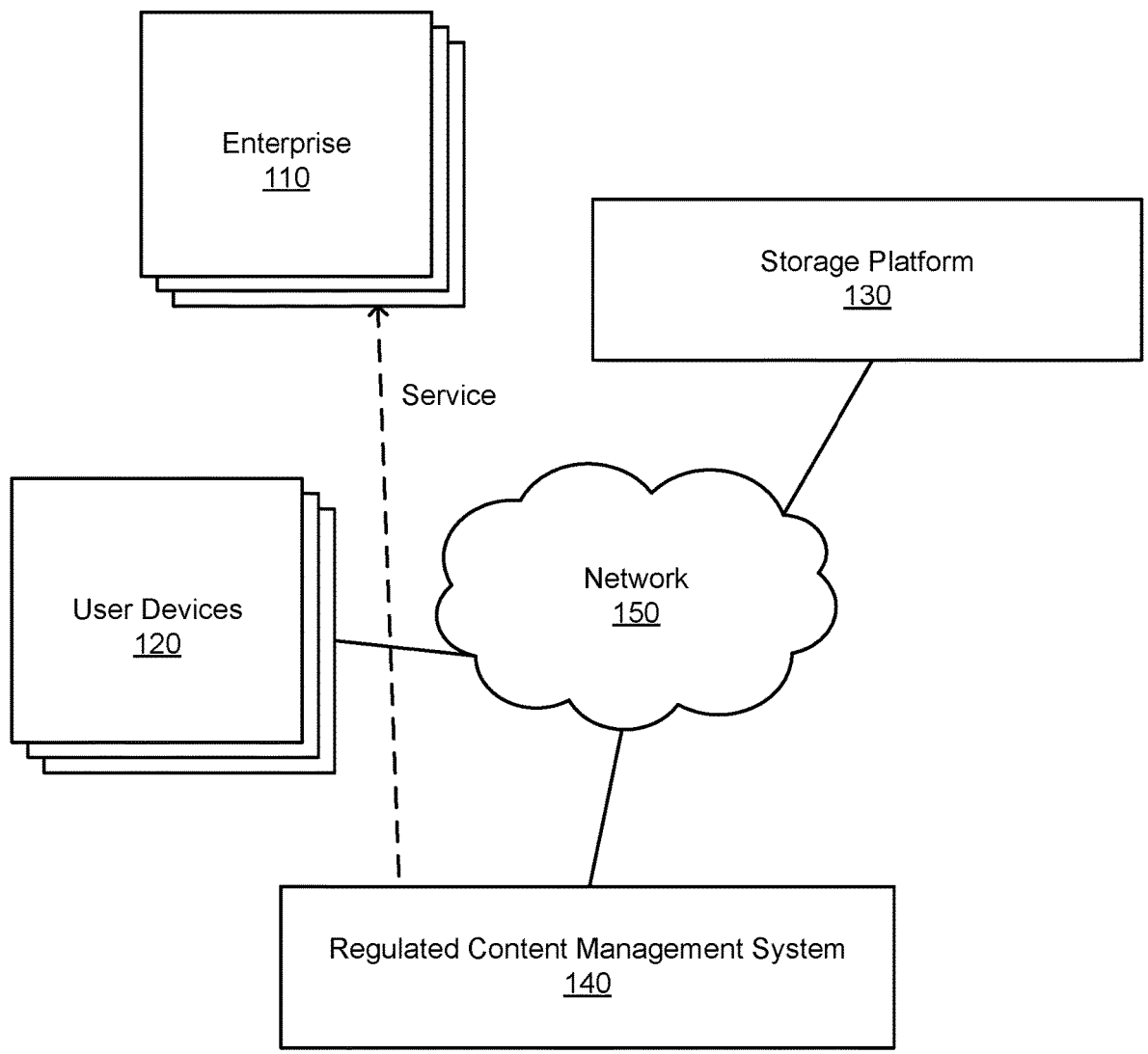

FIG. 1 illustrates an example computing environment 100 for managing regulated content, according to an embodiment. The environment includes entities such as enterprises 110, user devices 120, a storage platform 130, a regulated content management system 140, and a network 150. The network 150 connects the user devices 120, the storage platform 130, and the regulated content management system 140. In this computing environment, users are able to access and modify regulated content via user devices 120, such as mobile phones. The regulated content management system 140 implements various mechanisms to maintain the integrity of the regulated content by continuously tracking and keeping control over the content. In the illustrated example, only one storage platform and only one regulated content management system are shown, but there may be multiple instances of the storage platform and multiple instances of the regulate content management system.

The enterprises 110 receive regulated content management services provided by the regulated content management system 140. Examples of enterprises 110 include corporations, organizations, government agencies, universities and the like. In one embodiment throughout the description herein, enterprises include pharmaceutical companies, organizations, and other similar entities. Users (not shown) that are authorized by the enterprises 110 such as employees, officers, contractors, and the like may interact with the regulated content management system 140 using user devices 120 as further described below. For example, through a website hosted by the regulated content management system 140 or via dedicated applications installed on user devices 120, users can interact with the regulated content management system 140 to access regulated content.

User devices 120 enable users with access to regulated content items from the regulated content management system 140. Users can to create, edit, and review the regulated content items via the user devices 120. The users receive regulated content management services provided by the regulated content management system 140. In one embodiment, the regulated content management system 140 provides a cloud-based service in which regulated content is stored on a cloud content management service (e.g., DROPBOX™, BOX™, etc.) or a public cloud storage platform (e.g., AMAZON™, MICROSOFT™, etc.). Regulated content is most commonly stored on platforms that are carefully regulated and designed to handle this type of regulated content to ensure its integrity is maintained. Thus, in this embodiment, even though the regulated content is actually stored on a non-regulated platform, the regulated content management system 140 manages the content to maintain its integrity. In another embodiment, the regulated content is stored on a regulated platform rather than a public storage platform, or is stored and maintained within the regulated content management system 140 itself.

As described herein, regulated content items are electronic files that include regulated content subject to various regulations. That is, creation, modification, maintenance, archive, retrieval, and transmission of regulated content items are required to comply with one or more regulations such as Food and Drug Administration (FDA) regulations.

Only particular users are permitted to access regulated content items. Creation, editing, and removal of regulated content items are subject to approval by particular users. Examples of electronic files include Microsoft Word documents, Adobe PDF documents, Microsoft Excel spreadsheets, image files, video files and other file types containing regulated content. As one example, a regulated content item is Standard Operating Procedure of a pharmaceutical company. Creation, modification, maintenance, archive, retrieval, and transmission of regulated content items are required to comply with the regulations, such as 21 CFR part 11 issued by the FDA. It is appreciated, however, that in other embodiments, a regulated content item alternatively and/or additionally includes other forms of regulated content subject to other regulations such as financial (e.g., banking), energy (e.g., oil or gas), aviation, construction, and the like.

Users may interact with the regulated content management system 140 by visiting a website hosted by the regulated content management system 140. As an alternative to accessing the regulated content management system 140 through a web browser, the users may download and install a dedicated application of the regulated content management system 140 that is designed to interact with the regulated content management system 140 on the user devices 120. In various embodiments, multiple users are associated with an enterprise 110. Users associated with an enterprise 110 are employees, officers, contractors, or otherwise associated with the enterprise 110.

User devices 120 are computing devices such as mobile devices (e.g., smartphones or tablets with operating systems such as ANDROID or APPLE IOS), laptop computers, desktop computers, sensors, activity trackers or other vehicles, or any other type of network-enabled device that submits, accesses and edits regulated content such as files and documents. A user device 120 typically includes hardware and software to connect to the network 150 (e.g., via Wi-Fi and/or Long Term Evolution (LTE) or other wireless telecommunication standards), and to receive input from the users. In addition to enabling a user to interact with regulated content items from the regulated content management system 140, user devices 120 may also provide the regulated content management system 140 with data about the status and use of user devices 120, such as their network identifiers and geographic locations. As further described below with respect to FIGS. 2-3C, user devices 120 (e.g., mobile devices), dedicated applications installed on the user devices 120, and users' identities are validated and/or verified when users use dedicated applications to access regulated content. A collection of rules or statutes regulate how regulated content can be validated, accessed, who can access it, and how changes are controlled and documented.

Mobile phones and other mobile devices allow users to conveniently access and modify regulated content, but this poses additional challenges in maintaining the security and integrity of regulated content. Compared to non-mobile devices, mobile devices are more likely to be used by users that are not device owners, and to be subject to loss or tampering. There are a variety of steps that the regulated content management system 140 performs in conjunction with a mobile application installed on mobile devices to maintain the integrity of the regulated content at all times.

A storage platform 130 provides data storage services. The storage platform 130 stores data for the enterprises 110 and the users. For example, the storage platform 130 may be a cloud content management service (e.g., DROPBOX™, BOX™, etc.) or a public cloud storage platform (e.g., AMAZON™, MICROSOFT™, etc.). In addition, the storage platform 130 may be a hosted storage platform infrastructure that the enterprises 110 or the users use to store different content. The storage platform 130 may also be a storage platform infrastructure at an enterprise 110's premise. Enterprises 110 may create enterprise accounts at the storage platform 130. Users may create user accounts at the storage platform 130. The storage platform 130 stores regulated and non-regulated content items for enterprises 110 and users. The storage platform 130 may store regulated content items in storage locations (e.g., directories) under a master account for the regulated content management system 140. The storage platform 130 may store non-regulated content items for enterprises 110 and users in storage locations (e.g., directories) under accounts for the enterprises 110 and users.

The regulated content management system 140 provides regulated content management services for enterprises 110 and users. The regulated content management system 140 validates and maintains content items to comply with regulations for enterprises 110 and users. The regulated content management system 140 interacts with the storage platform 130 to create and to control regulated content items. The regulated content management system 140 provides users with accesses to create, to retrieve, to edit, and to approve regulated content items. The regulated content management system 140 validates regulated content items created on the regulated content management system 140 and stored on the storage platform 130. The regulated content management system 140 also validates regulated content items that are brought into the storage platform 130. Managing regulated content items stored on non-regulated storage platforms is further described in U.S. patent application Ser. No. 15/230,135, filed on Aug. 5, 2016, U.S. patent application Ser. No. 15/230,142, filed on Aug. 5, 2016, each of which is hereby incorporated by reference in its entirety.

The network 150 provides a communication infrastructure between the user devices 120, the storage platform 130, and the regulated content management system 140. In one embodiment, the network 150 uses standard communications technologies and/or protocols and can include the Internet. Thus, the network 150 can include links using technologies such as Ethernet, 802.11, InfiniBand, PCI Express Advanced Switching, etc. Similarly, the networking protocols used on the network 150 can include multiprotocol label switching (MPLS), transmission control protocol/Internet protocol (TCP/IP), User Datagram Protocol (UDP), hypertext transport protocol (HTTP) and secure hypertext transport protocol (HTTPS), simple mail transfer protocol (SMTP), file transfer protocol (FTP), etc. The data exchanged over the network 150 can be represented using technologies and/or formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 150 can use custom and/or dedicated data communications technologies instead of, or in addition to, the ones described above.

Regulated Content Management System

Figure 2:
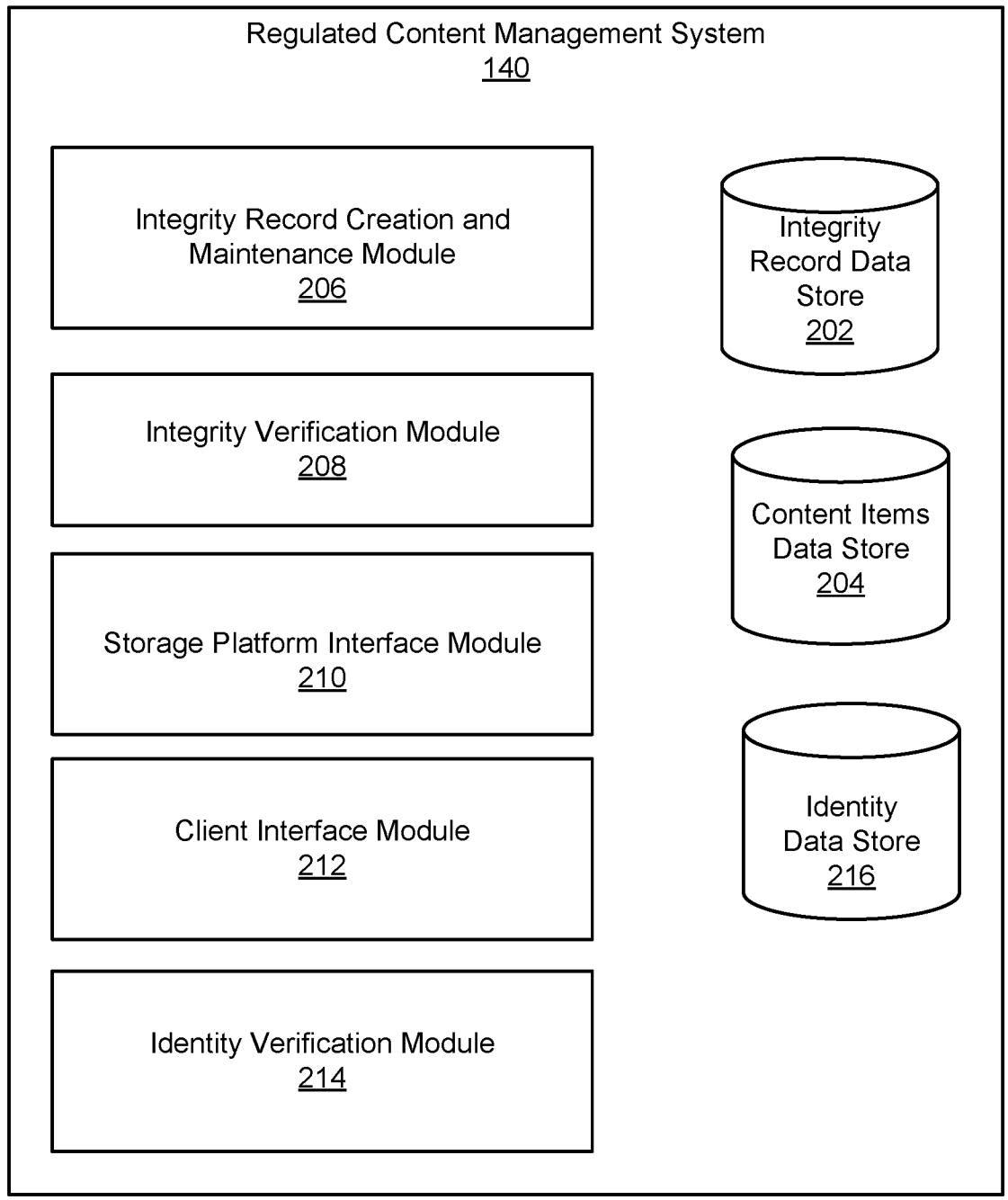
FIG. 2 is an example of a regulated content management system, in accordance with an embodiment.

The regulated content management system 140 is now described in more detail with respect to FIG. 2. FIG. 2 is a high-level block diagram illustrating a detailed view of modules within an example regulated content management system 140, according to one embodiment. Some embodiments of the regulated content management system 140 have different modules than those described here. Similarly, the functions can be distributed among the modules in a different manner than is described here. The components of the regulated content management system 140 include an integrity record data store 202, a content items data store 204, an integrity record creation and maintenance module 206, an integrity verification module 208, a storage platform interface module 210, a client interface module 212, an identity verification module 214, and an identity data store 216.

The integrity record data store 202 stores integrity records associated with regulated content items. An integrity record is associated with a regulated content item that is stored on the storage platform 130 and provides integrity information about the particular integrity record. When a copy of a regulated content item stored on the storage platform 130 is retrieved from the storage platform 130, the integrity information can be used to verify whether the content has been modified without approval since the last review. In other words, the integrity record associated with a regulated content item can be used to verify whether a regulated content item has been modified to any degree while being stored on the storage platform 130. Each integrity record is identified by a content item ID that is unique to the regulated content item. An integrity record includes various metadata associated with a regulated content item, such as a content item name, a storage location in the storage platform 130 where a regulated content item is stored, an integrity check, and other metadata specific to the regulated content item (e.g. Standard Operating Procedure, clinical trial protocol, case report forms, etc.) An integrity check can involve use of a checksum, a cyclic redundancy check (CRC), a digital signature or watermark, and other data verification measures.

The content items data store 204 temporarily stores various copies of regulated content items. For example, the content items data store 204 temporarily stores a copy of a regulated content item when creating the regulated content item and storing the regulated content item in the storage platform 130. As another example, the content items data store 204 temporarily stores a copy of a regulated content item upon retrieving the copy of the regulated content item stored in the storage platform 130.

The integrity record creation and maintenance module 206 creates and maintains integrity records associated with regulated content items. When receiving a request from a user to create a new regulated content item, the integrity record creation and maintenance module 206 creates an integrity record associated with the regulated content item. For example, the integrity record includes metadata of the regulated content item such as the content item ID, content item name, storage location and the like. The integrity record creation and maintenance module 206 may determine a unique value based on the content of the regulated content item. For example, a checksum may be calculated using one or more hash functions such as MD5 algorithm. The integrity record creation and maintenance module 206 further updates the integrity record for the regulated content item. For example, responsive to detecting a change in content in the regulated content item, the integrity record creation and maintenance module 206 updates the integrity check associated with the regulated content item. As another example, responsive to detecting a file name change, the integrity record creation and maintenance module 206 updates the content item name in the integrity record associated with the regulated content item.

The integrity verification module 208 verifies the integrity of regulated content items. The integrity verification module 208 verifies whether a regulated content item stored in the storage platform 130 retains its integrity when being stored in and/or retrieved from the storage platform 130. For example, when receiving a request from a user to create a regulated content item, the integrity verification module 208 verifies the integrity of the regulated content item to ensure that the regulated content item is not modified and complies with FDA regulations during the process of storing the regulated content item into the storage platform 130. As another example, when receiving a request from a user to retrieve a regulated content item, the integrity verification module 208 verifies the integrity of the regulated content item to ensure that the regulated content item is not modified and complies with FDA regulations during the process of retrieving the regulated content item from the storage platform 130.

The storage platform interface module 210 interacts with the storage platform 130 to provide regulated content for storage or to retrieve regulated content from storage. The storage platform interface module 210 receives regulated content items from or provides regulated content items to one or more other modules of the regulated content management system 140. For example, the storage platform interface module 210 visits a storage location of the storage platform 130 to obtain a copy of a regulated content item. The storage platform interface module 210 may provide the obtained copy to the content items data store 204 for storage. The storage platform interface module may also provide the obtained copy to the integrity verification module 208 for analysis. As another example, the storage platform interface module 210 provides a copy of the regulated content item to the client interface module 212, with which a user device can interact to receive the copy of the regulated content item. The storage platform interface module 210 also obtains storage locations at the storage platform 130 where regulated content items are stored. The storage platform interface module 210 provides the obtained information to other modules of the regulated content management system 140 for use. For example, the storage platform interface module 210 provides a storage location obtained from the storage platform 130 to the integrity record creation and maintenance module 206 for creation of an integrity record.

The client interface module 212 interacts with user devices to provide regulated content items or to receive instructions. For example, the client interface module 212 provides a regulated content item retrieved from the storage platform to a user device. The client interface module 212 receives various instructions such as a request to create a regulated content item, a request to retrieve a regulated content item, a request to edit a regulated content item, an approval of a regulated content item.

To comply with regulations such that regulated content can be accessed by only authorized users, the identity verification module 214 verifies a dedicated application's authenticity, a device's authenticity, as well as a user's identity before granting a user with access to the regulated content management system 140. In particular, the identity verification module 214 uses identity information received from a user device 120 and identity information stored in the identity data store 216 to determine whether or not to grant a user with access. In various embodiments, dedicated applications installed on user devices 120 are configured to provide information about the dedicated applications, devices, and users to the regulated content management system 140 for verification and authenticity. For example, the identity verification module 214 receives, from a user device 120, a device ID of the user device 120 on which the dedicated application is installed, and user credential provided by the user using the user device to access regulated content. The identity verification module 214 may further receive, from a user device 120, a token such as a certificate associated with a dedicated application, a value identifying or representing the certificate, or a value representing that there is no certificate.

If the identity verification module 214 receives a certificate (or a value) from a user device 120, the identity verification module 214 compares the received certificate (or value) to a certificate associated with the dedicated application that is stored in the identity data store 216 or to a predetermined value to verify the authenticity of the dedicated application. When the two certificates (e.g., X.509 certificates) match or when the received certificate (or value) matches the predetermined value, the identity verification module 214 confirms that authenticity of the dedicated application installed on the user device 120. In other words, the dedicated application installed on the user device is not tampered or modified by any means. When the dedicated application is distributed via a distribution platform (e.g., an app store for usage with devices running iOS) that distributes application packages that are encrypted, there is typically no certificate distributed with the application package to the user device as the distribution platform ensures the integrity of the app such that this type of application download and installation process does not require certificates. Thus, the identity verification module 214 verifies the authenticity of the dedicated application installed on a user device 120 when receiving no certificate from the user device 120 or when receiving a value indicating that there is no certificate from the user device 120.

The identity verification module 214 queries, the received device ID, among device IDs stored in the identity data store 216 that are associated with user devices 120 that have been authorized. When there is a match, the identity verification module 214 confirms that a particular user device is an authorized device that is permitted to access the regulated content management system 140. The identity verification module 214 further queries, the received user credential, among user credential stored in the identity data store 216 that is associated with users that have been authorized to access the regulated content management system 140. When there is a match, the identity verification module 214 confirms the user's identity and allows the user to access regulated content. The user is allowed to access regulated content only when the identity and/or authenticity of the user, the user device, and the dedicated application installed on the user device all have been verified.

The identity verification module 214 may alternatively or additionally employ other mechanisms to verify the authenticity and/or the identity of a dedicated application installed on a user device that a user uses to access regulated content, of the user device, and of the user. For example, the identity verification module 214 may generate and provide one or more challenge tokens to the dedicated application or the user device. The dedicated application, the device, and/or the user are prompted to process the received challenge token(s), generate one or more challenge responses, and provide the challenge response(s) to the identity verification module 214. The identity verification module 214 processes the received challenge response(s) to determine whether or not the user should access the regulated content management system 140.

The identity data store 216 stores identity information of dedicated applications, authorized user devices, and authorized users. For example, the identity data store 216 stores certificates associated with the dedicated applications, user device IDs identifying the authorized user devices, and user credentials (e.g., user name, passwords, fingerprints, etc.) associated with the authorized users, and the like.

Figure 3A:
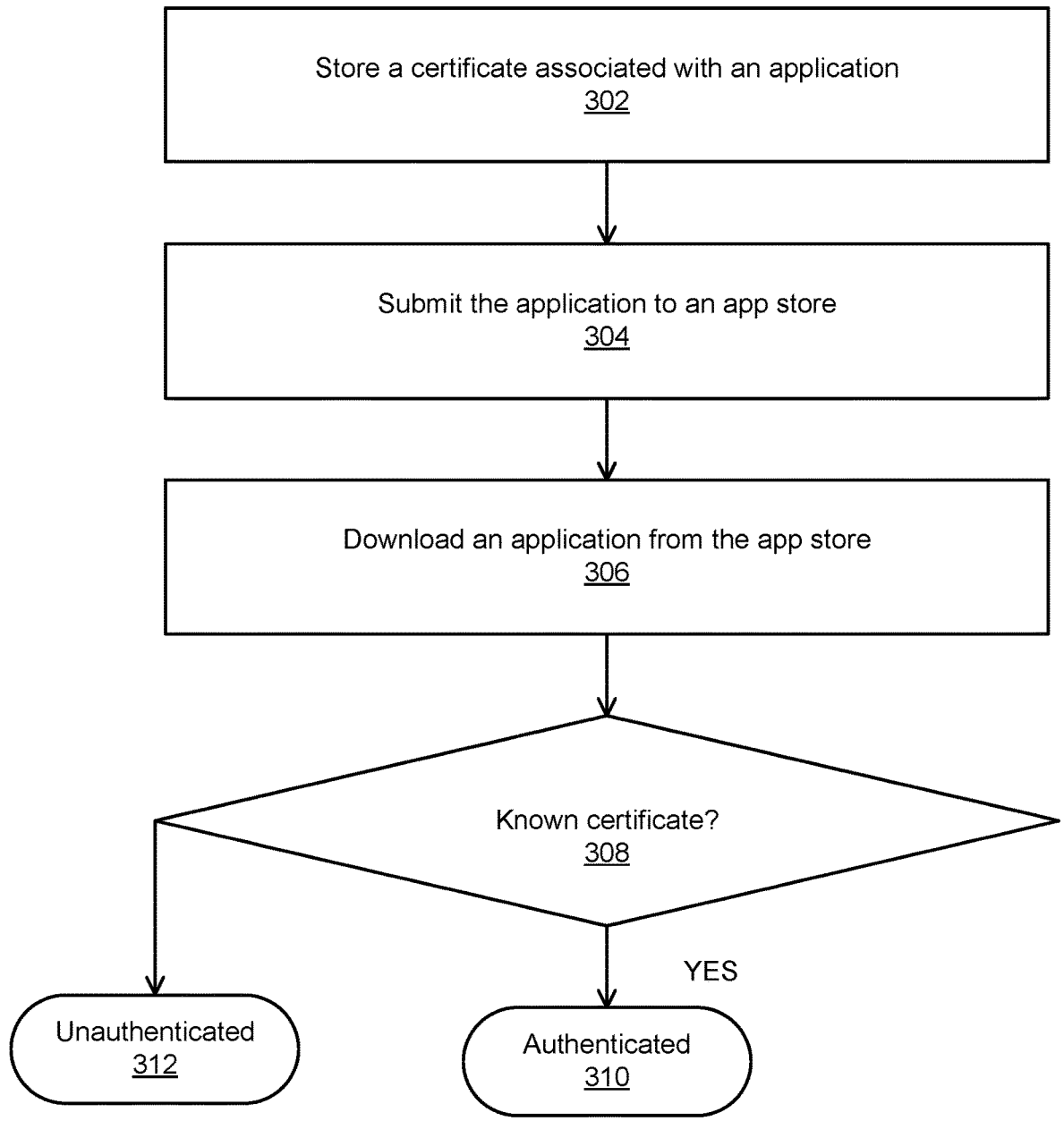
FIG. 3A is a flow chart illustrating an example process of providing a dedicated application for public access, in accordance with an embodiment.

FIG. 3A is a flow chart illustrating an example process of providing a dedicated application for public access, according to one embodiment. The regulated content system 140 stores 302 a certificate (or a certificate ID) that is associated with a dedicated application. The dedicated application of the regulated content management system 140 is configured to interact with the regulated content management system 10. The dedicated application, when installed on mobile devices, provides users with access to interact with the regulated content management system 140. A developer submits 304 a dedicated application to the application store where users download various applications. Typically, a developer is required to sign an application with a signature when submitting the application to the application store to certify the application. The signature may be generated based on a private key and can be verified by public keys. The application store may provide a certificate associated with the application for certifying the developer's identity when a user downloads the application from the application data store. The application store may also provide no certificate associated with the application when distributing application packages in a secured manner.

The User downloads 306 a copy of the dedicated application from the application store. The downloaded application is associated with a certificate (or a value). The regulated content management system 140 receives and verifies 308 whether the received certificate (or value) is known and validate the downloaded application. For example, the regulated content management system 140 compares the received certificate (or value) to a certificate (or to a predetermined value) stored on the regulated content management system 140. If the received certificate (or value) is known (e.g., matches a certificate stored on the regulated content management system 140 or a predetermined value), then validation of the downloaded application succeeds. The downloaded application is authenticated 310. If the received certificate is unknown, then validation of the downloaded application fails, the regulated content management system 140 determines 312 that the application's code has been changed.

Figure 3B:
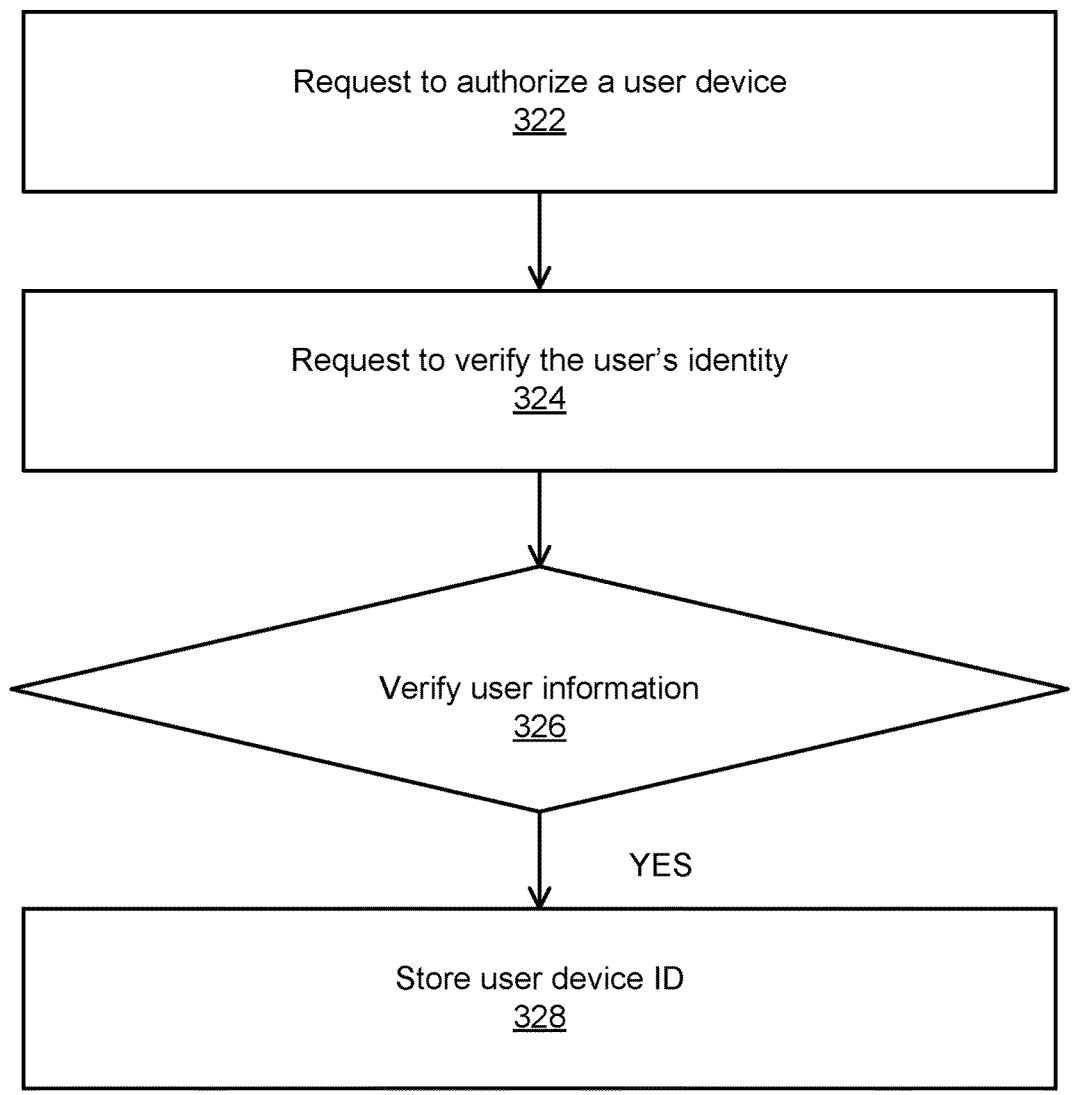
FIG. 3B is a flow chart illustrating an example process of authorizing a user device, in accordance with an embodiment.

FIG. 3B illustrates a process of authorizing a user device, according to one embodiment. In some embodiments, only authorized user devices are allowed to access the regulated content management system 140. A user requests 322 to authorize a user device 120. For example, a user sends a request via an email, a text message, and the like to the regulated content management system 140 to request to authorize the user device. The user device is identified by a user device ID (e.g., unique device identifier (UDID), the client device's IP address, Subscriber Identity Module (SIM), the client device's MAC address, application package identifiers (e.g., APK (Android Application Package) ID)). The regulated content management system 140 obtains the user device ID in a variety of ways. For example, the user is prompted to provide the user device ID to the regulated content management system 140, the dedicated application installed on the user device is configured to send the user device ID to the regulated content management system 140, the regulated content management system 140 in communication with the user device obtains the user device ID from the user device, and the like.

In response to the user's request, the regulated content management system 140 requests to verify the user's identity. For example, the regulated content management system 140 sends the user an email with a link that directs to a website hosted by the regulated content management system 140. The user can visit the website using a local browser on the user device that is being authorized or using another device. The user enters user credential or other security information into the website hosted by the regulated content management system 140 as requested. The regulated content management system 140 verifies 326 the user credential or other security information entered by the user to confirm that the user is an authorized user of the regulated content system 140. The regulated content management system 140 compares the user information entered by the user to existing records. When there is a match, the regulated content management system 140 successfully verifies the user's identity. In response to a successful result, the regulated content management system 140 stores 328 the user device ID.

Figure 3C:
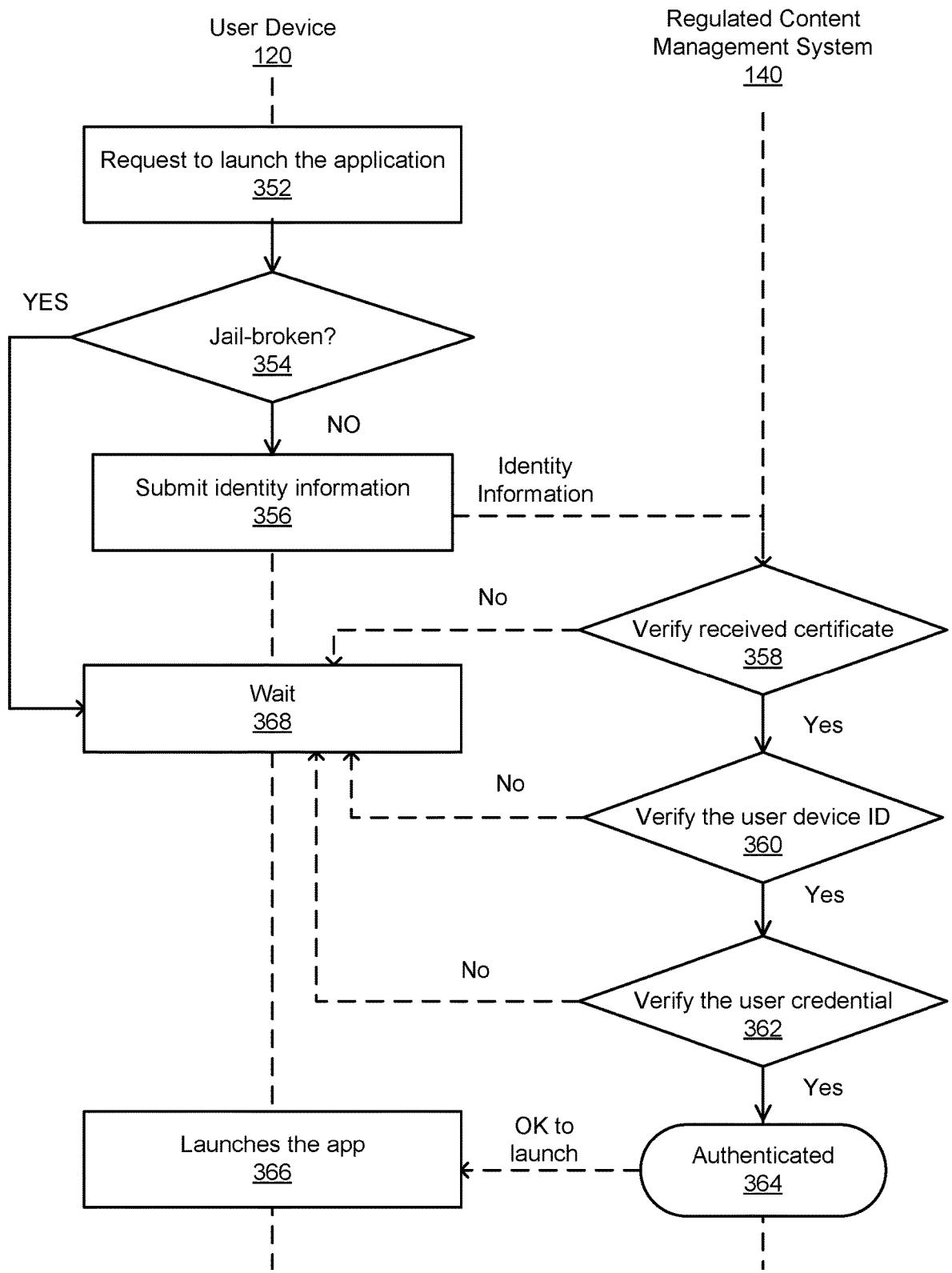
FIG. 3C is a flow chart illustrating an example process of a user launching a dedicated application on a user device to access regulated content, in accordance with an embodiment.

FIG. 3C illustrates a process of a user launching a dedicated application on a user device to access regulated content, according to one embodiment. The user device 120 receives 352 a user's request to launch the dedicated application. For example, a user clicks on the dedicated application in a user interface presented by the user device to launch the dedicated application. The dedicated application examines 354 whether or not the user device is jail-broken, unlocked, or otherwise modified or tampered with. If the phone is jail-broken, the dedicated application proceeds to wait for 368 further instructions but does not allow the user to proceed with accessing regulated content. Ultimately, the further instructions may be a denial of access or notification of refusal to launch the application or refusal to otherwise proceed with the application. Otherwise, the dedicated application collects identity information such as the user device ID and the user's credentials and submits 356 the identity information to the regulated content management system 140 for verification. The identity information may further include the certificate associated with the application, a value representing the certificate, or a value representing there is no certificate. The regulated content management system 140 verifies the identity information to determine whether or not the user can launch the dedicated application and thereby interact with the regulated content management system 140. If receiving a certificate (or a value), the regulated content management system 140 verifies 358 the received certificate (or value) to confirm that the dedicated application installed on the user device 120 is authentic. The received certificate (or value) is compared to the certificate (or a predetermined value) stored on the regulated content management system 140. When there is a match, the regulated content management system 140 confirms that the dedicated application is authentic and proceeds to verifying whether or not the user device is authorized to access the regulated content management system 140. If the verification of the received certificate fails, the dedicated application on the user device 120 is not authentic. The regulated content management system 140 refuses to connect with the user device 120 and instructs the dedicated application running on the user device 120 to wait 368 for further instructions, which may be a notification of some further action to take or notification that the process has ended due to inability to verify the certificate. If no certificate or value is received from the user device 120, the regulated content management system 140 confirms that the dedicated application is authentic.

The regulated content management system 140 verifies 360 the received user device ID. The received user device ID is used to query the user device IDs stored on the regulated content management system 140 that are associated with the authorized user devices of the regulated content management system 140. When finding a match, the regulated content management system 140 confirms that the user device 120 has been authorized and proceeds to verify the user identity. If there is no match, the verification of the user device 120 fails indicating that the user device 120 is not an authorized user device. The regulated content management system 140 refuses to connect with the user device 120 and instructs the dedicated application on the user device 120 to wait 368 for further instructions, which may include a notification to take another particular action or a notification that the process has ended due to inability to verify the device. The user may be notified that the verification of the user device fails and the device needs to be authorized. For example, the regulated content management system 140 may send an email or other forms of notification to the user to prompt the user to request to authorize the user device 120.

The regulated content management system 140 verifies 362 the received user credential to determine whether or not the user is an authorized user of the regulated content management system 140. The received user credential is used to query the user credentials stored on the regulated content management system 140 that is associated with the authorized users. When finding a match, the regulated content management system 140 confirms that the user of the user device 120 is an authorized user and approves the user's request to launch the dedicated application on the user device 120 to access the regulated content. The regulated content management system 140 establishes a connection with the user device 120. If there is no match, the verification of the user device 120 fails, which indicates that the user is not an authorized user. The regulated content management system 140 refuses to connect with the user device 120 and instructs the application running on the user device 120 to wait 368 for further instructions, which can be a notification of a further action to take or an end to the process. The regulated content management system may prompt the user to register to become an authorized user of the regulated content management system 140.

When the regulated content management system 140 verifies the authenticity and/or identity of the dedicated application, the user device, and the user, the regulated content management system 140 authenticates 364 the combination of the dedicated application, the user device 120, and the user and approves the user's request to access the regulated content management system 140. The regulated content management system 140 instructs the application to launch. In response, the application running on the user device 120 launches 366 and establishes a connection with the regulated content management system 140. For example, a secured communication connection is established between the user device 120 and the regulated content management system 140, for example, via an API (application program interface) of the regulated content management system 140. The user can, via the dedicated application on the user device 120, to interact with the regulated content management system 140 to access regulated content.

Figure 4:
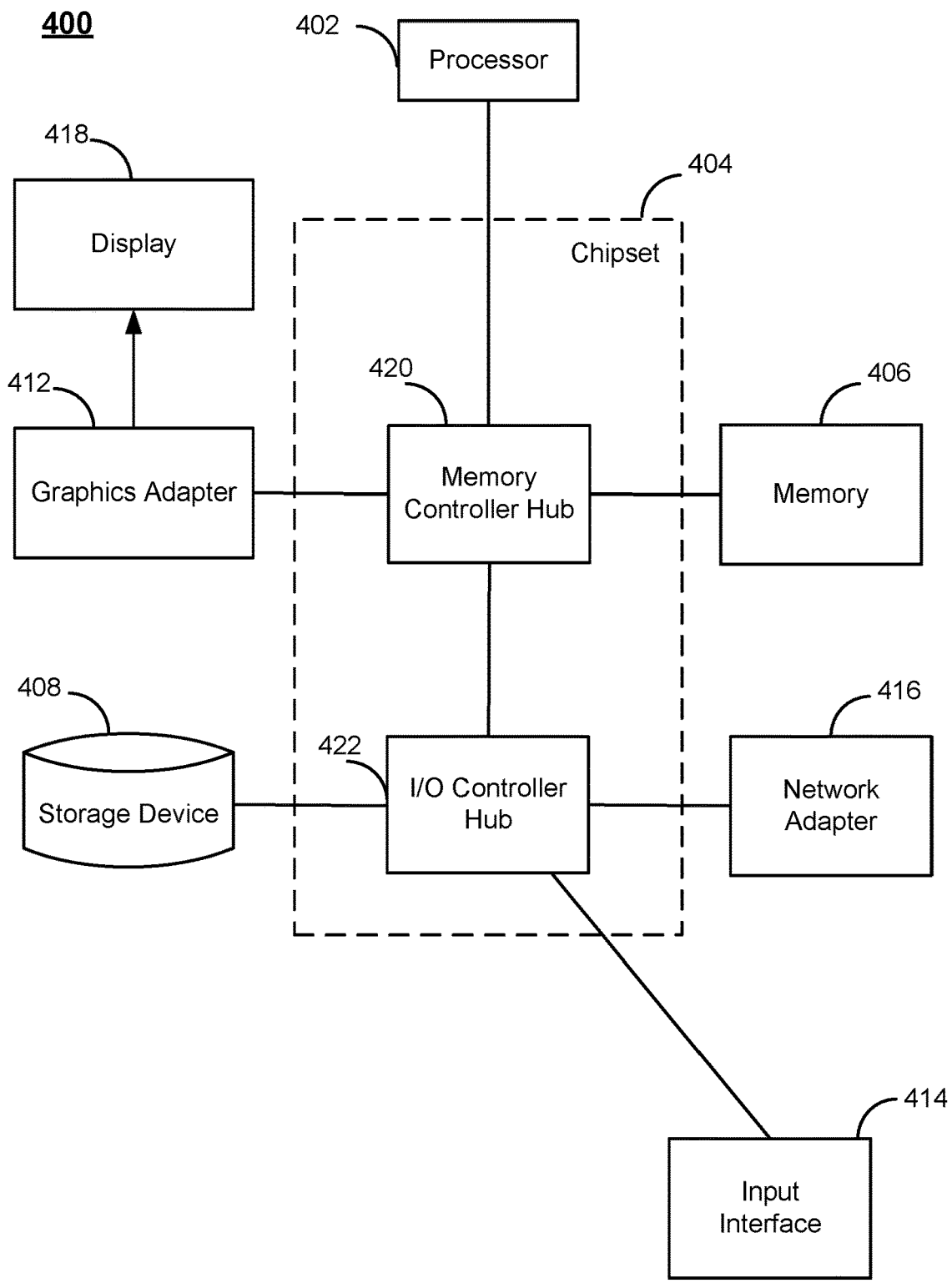
FIG. 4 is a diagram of a computer system, in accordance with an embodiment.

Turning now to a discussion of the implementation the regulated content management system 140, FIG. 4 is a high-level block diagram illustrating an example computer 400 for implementing the entities shown in FIG. 1. The computer 400 includes at least one processor 402 coupled to a chipset 404. The chipset 404 includes a memory controller hub 420 and an input/output (I/O) controller hub 422. A memory 406 and a graphics adapter 412 are coupled to the memory controller hub 420, and a display 418 is coupled to the graphics adapter 412. A storage device 408, an input device 414, and network adapter 416 are coupled to the I/O controller hub 422. Other embodiments of the computer 400 have different architectures.

The storage device 408 is a non-transitory computer-readable storage medium such as a hard drive, compact disk read-only memory (CD-ROM), DVD, or a solid-state memory device. The memory 406 holds instructions and data used by the processor 402. The input interface 414 is a touch-screen interface, a mouse, track ball, or other type of pointing device, a keyboard, or some combination thereof, and is used to input data into the computer 400. In some embodiments, the computer 400 may be configured to receive input (e.g., commands) from the input interface 414 via gestures from the user. The graphics adapter 412 displays images and other information on the display 418. The network adapter 416 couples the computer 400 to one or more computer networks.

The computer 400 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 408, loaded into the memory 406, and executed by the processor 402.

The types of computers 400 used by the entities of FIG. 1 can vary depending upon the embodiment and the processing power required by the entity. For example, the regulated content item management system 140 can run in a single computer 400 or multiple computers 400 communicating with each other through a network such as in a server farm. The computers 400 can lack some of the components described above, such as graphics adapters 412, and displays 418.

OTHER CONSIDERATIONS

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for storing and managing regulated content items on non-regulated storage platforms. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed here

What is claimed is:

1. A computer-implemented method comprising:
   receiving, by a regulated content management system from a client device operated by a user, a request to access regulated content subject to one or more regulations via a mobile application on the client device, wherein the regulated content is stored on a non-regulated storage platform and the regulated content is only accessible by the client device through the regulated content management system, wherein non-regulated content that is not subject to the one or more regulations and that is also stored on the non-regulated storage platform is directly accessible by the client device, and wherein the regulated content management system is separate from the non-regulated storage platform;
   receiving, by the regulated content management system from the client device, a token associated with the mobile application, wherein the token is configured to be used for verifying an authenticity of the mobile application upon installation of the mobile application on the mobile device, the mobile application and the token downloaded from an application store;
   receiving, by the regulated content management system from the client device, a device identifier uniquely identifying the client device;
   receiving, from the user via the client device, user credentials identifying the user;
   comparing, by the regulated content management system, the token, the device identifier, and the user credentials to data stored on the regulated content management system for validation of the mobile application, the client device, and the user, wherein the validation of the mobile application, the client device, and the user comprises (i) verifying the token, (ii) verifying the user credentials, and (iii) verifying the device identifier to confirm that the client device is authorized to access the regulated content and that the client device is authorized to have the mobile application installed; and
   responsive to successful validation, establishing a connection with the mobile application,
   wherein the regulated content is provided via the connection between the mobile application and the regulated content management system.

2. The computer-implemented method of claim 1, further comprising:
   receiving, from the client device, a request via the mobile application for a regulated content item;
   retrieving the regulated content item from the non-regulated platform;
   verifying an integrity of the regulated content item; and
   responsive to verification of the integrity of the regulated content item, providing the regulated content item via the connection to the client device.

3. The computer-implemented method of claim 1, wherein the token comprises a certificate of validation provided upon introduction of the mobile application to the application store.

4. The computer-implemented method of claim 1, wherein the token comprises a value representing that no certificate of validation was provided upon introduction of the mobile application to the application store.

5. The computer-implemented method of claim 1, wherein the mobile application is configured to detect whether the client device has been tampered with, and to terminate a connection with the regulated content management system responsive to detecting that the client device is modified.

6. The computer-implemented method of claim 1, further comprising:
   waiting for the application to determine whether the client device is jail-broken or unlocked before comparing the token, the device identifier, and the user credentials.

7. The computer-implemented method of claim 1, wherein the non-regulated storage platform is a public cloud storage platform.

8. A regulated content management system comprising:
   a processor; and
   memory storing instructions configured to cause the processor to perform steps comprising:
      receiving, by the regulated content management system from a client device operated by a user, a request to access regulated content subject to one or more regulations via a mobile application on the client device, wherein the regulated content is stored on a non-regulated storage platform and the regulated content is only accessible by the client device through the regulated content management system, wherein non-regulated content that is not subject to the one or more regulations and that is also stored on the non-regulated storage platform is directly accessible by the client device, and wherein the regulated content management system is separate from the non-regulated storage platform;

receiving, by the regulated content management system from the client device, a token associated with the mobile application, wherein the token is configured to be used for verifying an authenticity of the mobile application upon installation of the mobile application on the mobile device, the mobile application and the token downloaded from an application store;

receiving, by the regulated content management system from the client device, a device identifier uniquely identifying the client device;

receiving from the user via the client device, user credentials identifying the user;

comparing, by the regulated content management system, the token, the device identifier, and the user credentials to data stored on the regulated content management system for validation of the mobile application, the client device, and the user, wherein the validation of the mobile application, the client device, and the user comprises (i) verifying the token, (ii) verifying the user credentials, and (iii) verifying the device identifier to confirm that the client device is authorized to access the regulated content and that the client device is authorized to have the mobile application installed; and responsive to successful validation, establishing a connection with the mobile application, wherein the regulated content is provided via the connection between the mobile application and the regulated content management system.

9. The regulated content management system of claim 8, wherein the instructions are further configured to cause the processor to perform:

receiving, from the client device, a request via the mobile application for a regulated content item;

retrieving the regulated content item from the non-regulated platform;

verifying an integrity of the regulated content item; and responsive to verification of the integrity of the regulated content item, providing the regulated content item via the connection to the client device.

10. The regulated content management system of claim 8, wherein the token comprises a certificate of validation provided upon introduction of the mobile application to the application store.

11. The regulated content management system of claim 8, wherein the token comprises a value representing that no certificate of validation was provided upon introduction of the mobile application to the application store.

12. The regulated content management system of claim 8, wherein the mobile application is configured to detect whether the client device has been tampered with, and to terminate a connection with the regulated content management system responsive to detecting that the client device is modified.

13. The regulated content management system of claim 8, wherein the instructions are further configured to cause the processor to perform:

waiting for the application to determine whether the client device is jail-broken or unlocked before comparing the token, the device identifier, and the user credentials.

14. The regulated content management system of claim 8, wherein the non-regulated storage platform is a public cloud storage platform.

15. A non-transitory computer-readable storage medium comprising computer program instructions executable by a processor and configured to cause the processor to perform steps comprising:

receiving, by a regulated content management system from a client device operated by a user, a request to access regulated content subject to one or more regulations via a mobile application on the client device, wherein the regulated content is stored on a non-regulated storage platform and the regulated content is only accessible by the client device through the regulated content management system, wherein non-regulated content that is not subject to the one or more regulations and that is also stored on the non-regulated storage platform is directly accessible by the client device, and wherein the regulated content management system is separate from the non-regulated storage platform;

receiving, by the regulated content management system from the client device, a token associated with the mobile application, wherein the token is configured to be used for verifying an authenticity of the mobile application upon installation of the mobile application on the mobile device, the mobile application and the token downloaded from an application store;

receiving, by the regulated content management system from the client device, a device identifier uniquely identifying the client device;

receiving from the user via the client device, user credentials identifying the user;

comparing, by the regulated content management system, the token, the device identifier, and the user credentials to data stored on the regulated content management system for validation of the mobile application, the client device, and the user, wherein the validation of the mobile application, the client device, and the user comprises (i) verifying the token, (ii) verifying the user credentials, and (iii) verifying the device identifier to confirm that the client device is authorized to access the regulated content and that the client device is authorized to have the mobile application installed; and responsive to successful validation, establishing a connection with the mobile application, wherein the regulated content is provided via the connection between the mobile application and the regulated content management system.

16. The non-transitory computer-readable storage medium of claim 15, wherein the instructions are further configured to cause the processor to perform:

receiving, from the client device, a request via the mobile application for a regulated content item;

retrieving the regulated content item from the non-regulated platform;

verifying an integrity of the regulated content item; and responsive to verification of the integrity of the regulated content item, providing the regulated content item via the connection to the client device.

17. The non-transitory computer-readable storage medium of claim 15, wherein the token comprises a certificate of validation provided upon introduction of the mobile application to the application store.

18. The non-transitory computer-readable storage medium of claim 15, wherein the token comprises a value representing that no certificate of validation was provided upon introduction of the mobile application to the application store.

19. The non-transitory computer-readable storage medium of claim 15, wherein the instructions are further configured to cause the processor to perform:
waiting for the application to determine whether the client device is jail-broken or unlocked before comparing the token, the device identifier, and the user credentials.

20. The non-transitory computer-readable storage medium of claim 15, wherein the non-regulated storage platform is a public cloud storage platform.

* * * * *